United States Patent [19]

Heersink et al.

[11] 4,127,179
[45] Nov. 28, 1978

[54] SCRAPER MECHANISM FOR DISK GANG HARROWS

[75] Inventors: Evert J. Heersink, Hinsdale; Eugen J. Birkenbach, Park Ridge; Daniel M. Brown, Villa Park; Thomas E. Schroeder, Burr Ridge, all of Ill.

[73] Assignee: International Harvester Company, Chicago, Ill.

[21] Appl. No.: 743,837

[22] Filed: Nov. 22, 1976

[51] Int. Cl.[2] .............................................. A01B 15/16
[52] U.S. Cl. ................................... 172/565; 403/262
[58] Field of Search .............. 172/566, 565, 558, 563, 172/609, 610, 456, 311, 762, 763, 774; 403/262

[56] References Cited

U.S. PATENT DOCUMENTS

| 678,248 | 7/1901 | Hoyt | 172/566 |
|---|---|---|---|
| 1,204,306 | 11/1916 | Offerman | 172/566 |
| 1,512,257 | 10/1924 | White | 172/565 |
| 1,512,258 | 10/1924 | White | 172/565 |
| 3,438,448 | 4/1969 | Richey | 172/558 |
| 3,811,516 | 5/1974 | Thompson | 172/456 |
| 3,831,685 | 8/1974 | Birkenbach | 172/583 |
| 3,833,067 | 9/1974 | Peterson | 172/566 |

OTHER PUBLICATIONS

International Harvester 500 Disk Harrow Advertizing Brochure AD3686-D-7 dated 2/1975, pp. 23 and 24.
International Harvester, 475 Tandem Disk Harrow, Operators Manual dated 11/1975.

*Primary Examiner*—Richard J. Johnson
*Attorney, Agent, or Firm*—James J. Getchius; Neal C. Johnson; F. David AuBuchon

[57] ABSTRACT

A scraper mechanism for the disk gangs of disk harrows and embodying a series of flexible scraper arms, one for each disk, which depend from a common scraper support and carry scraper blades at their lower ends. The upper ends of the scraper arms are turned laterally and provide short attachment sections of wide angle concavo-convex configuration. A clamping bolt extends through the apex of each section and the support and, upon tightening thereof progressively flattens the section against the support and thus swings the depending portion of the scraper arm in the direction of the respective disk for regulating the pressure of the scraper blade against the disk. Means are provided for shifting the position of the common scraper support so that collective adjustment of the various scraper blades may be effected. Where folding wing type disk harrows are concerned, a modified scraper arm construction is employed to avoid frame interference in the vicinity of the hinge connection for the wing gang section, such construction embodying a wide angle concavo-convex attachment section wherein the convex side thereof abuts against a flat surface which is downwardly offset from the scraper support. A pair of clamping bolts project through the concavo-convex section on opposite sides thereof and, when tightened, flattens the section against such offset surface for scraper blade pressure regulating purposes. Where a given disk gang utilizes a furrow filler disk at its outer end, a second modified form of scraper arm construction is employed wherein an over-hanging extension bracket on the end of the scraper support is provided.

19 Claims, 11 Drawing Figures

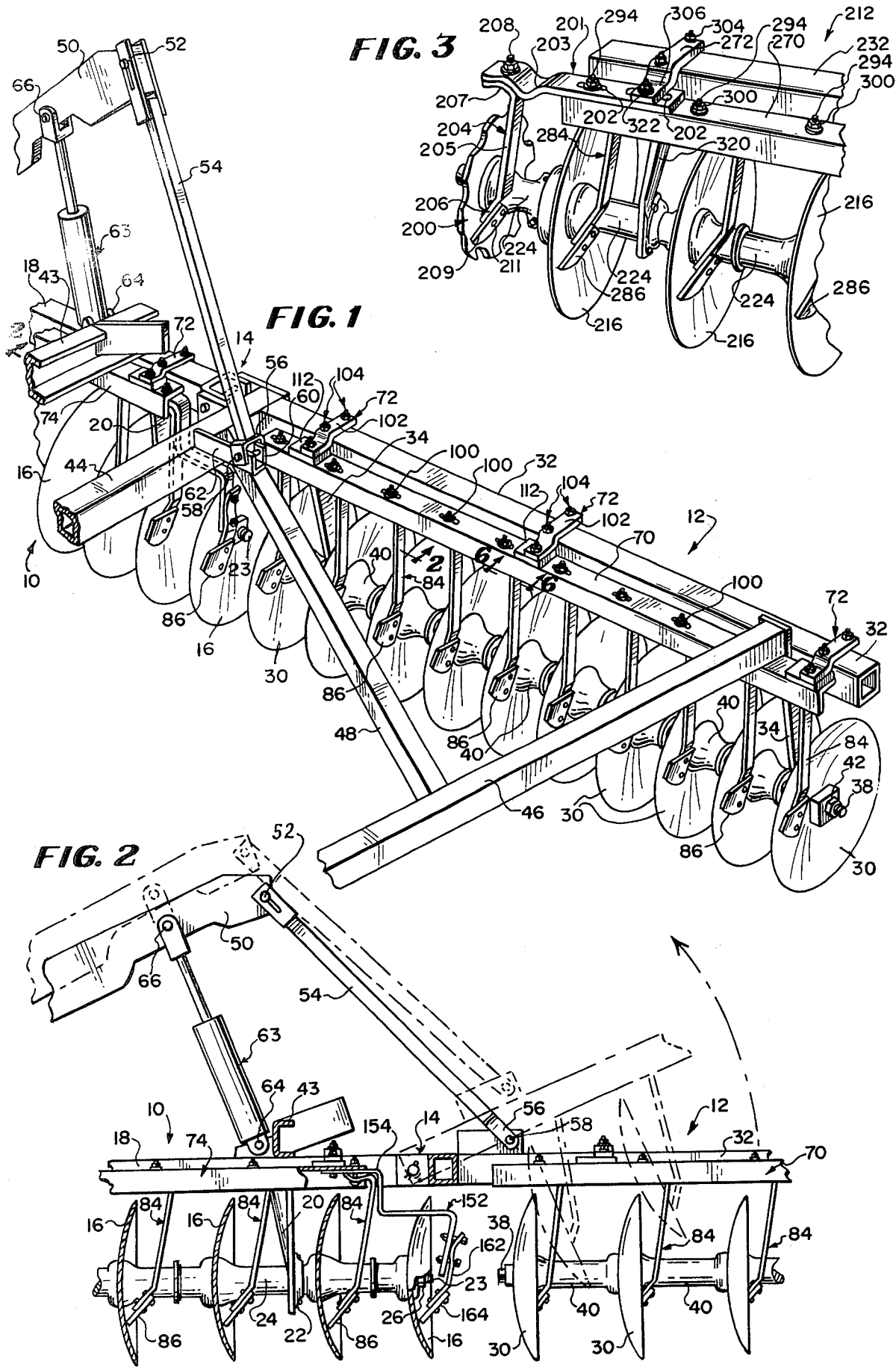

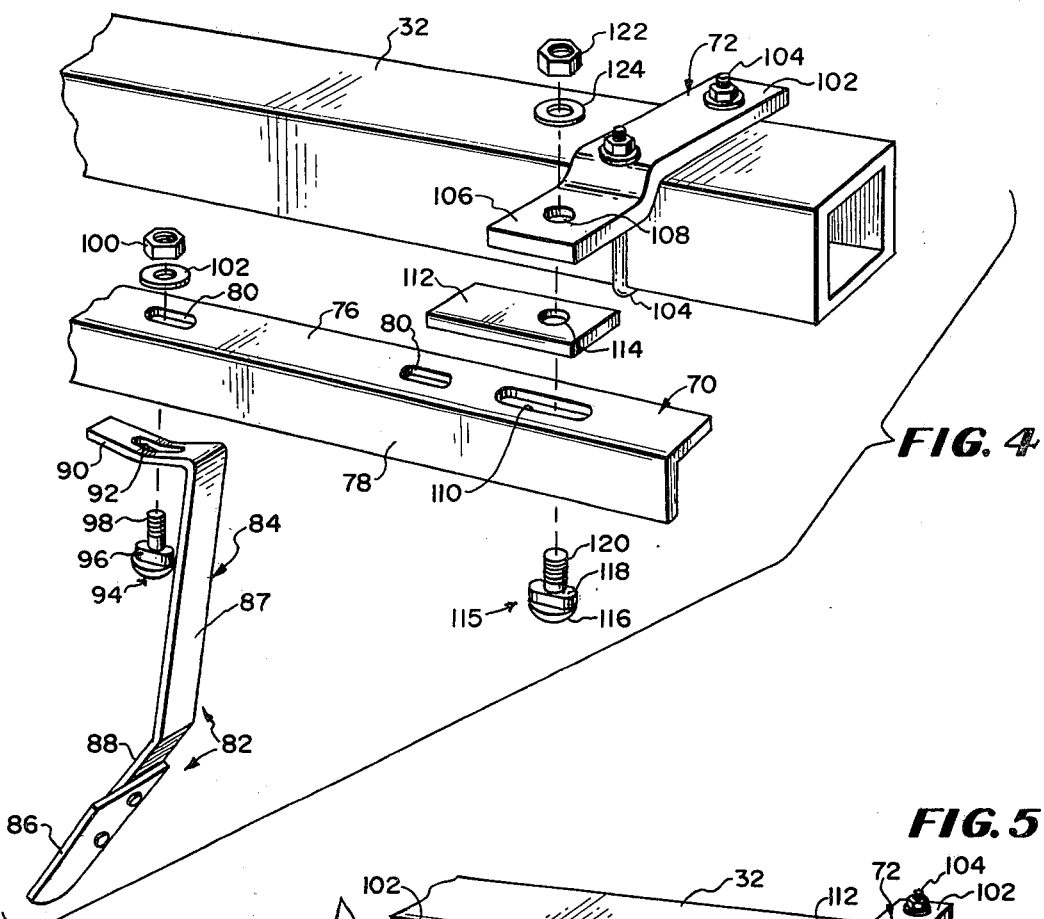
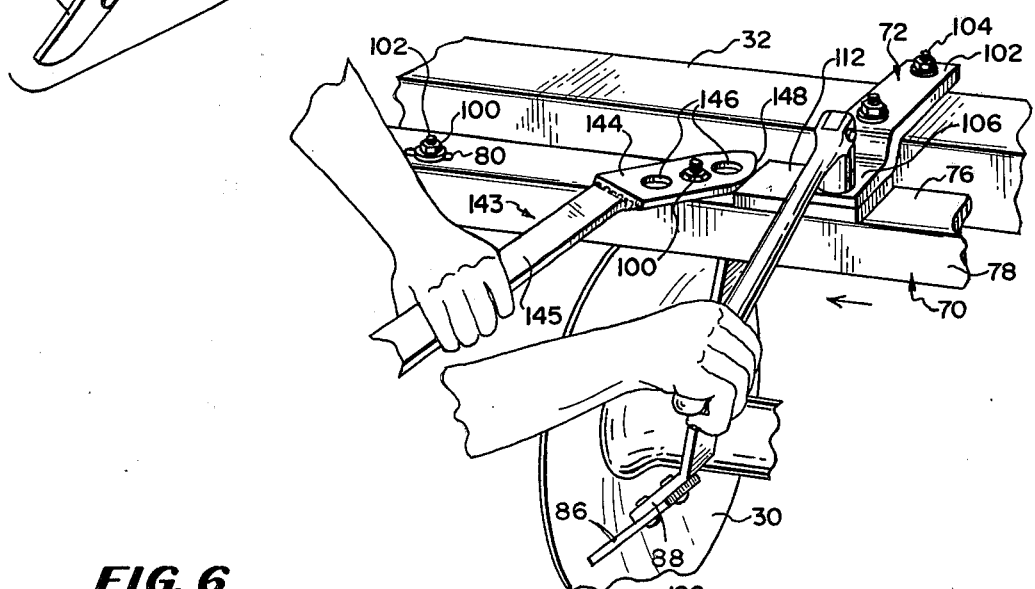
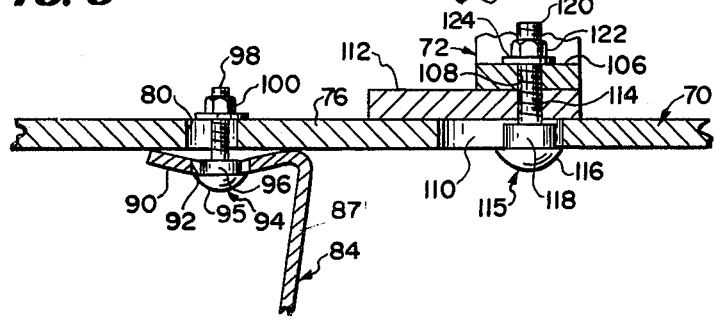

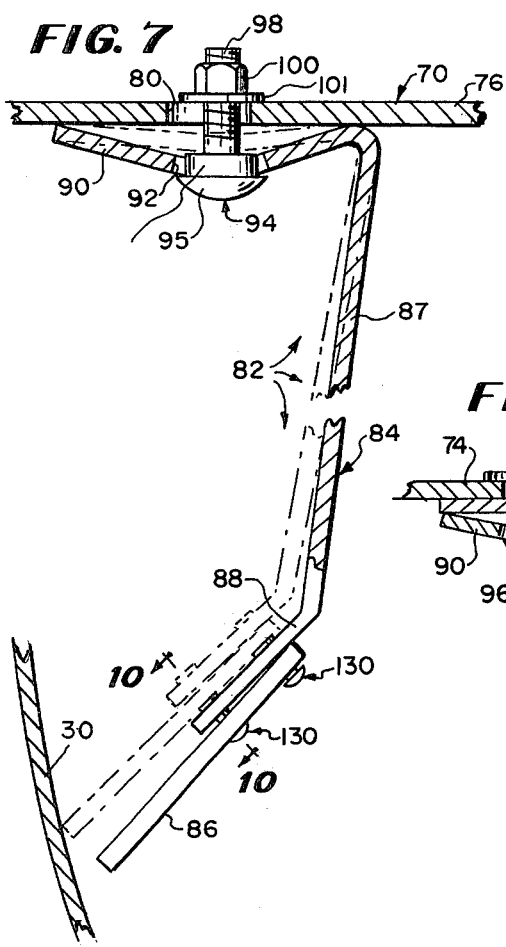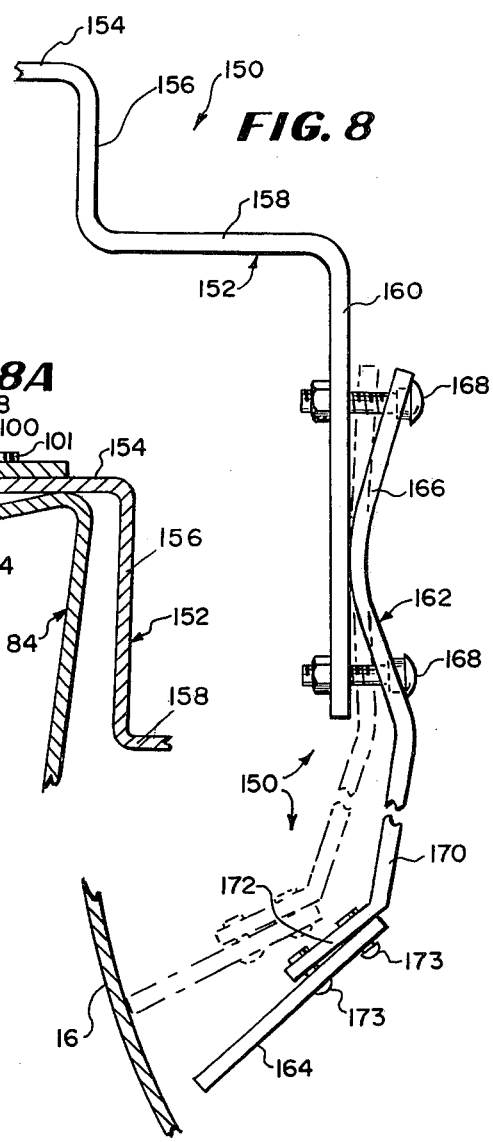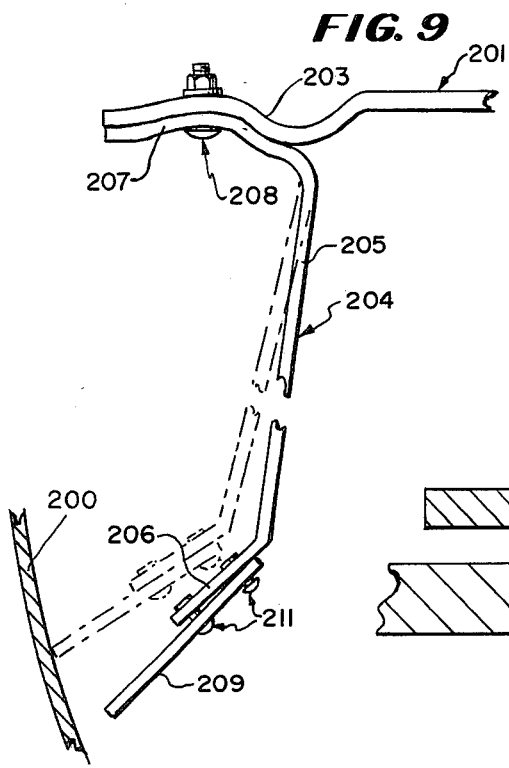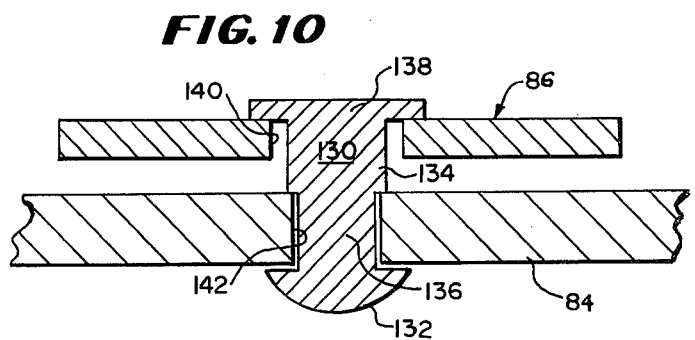

SCRAPER MECHANISM FOR DISK GANG HARROWS

The present invention relates to agricultural implements and has particular reference to disk implements such as disk harrows and the like. Still more specifically, the invention is concerned with a novel and improved scraper means for removing soil from the concave sides of the disks which are associated with a disk harrow and which, unless removed, might interfere with rotation of the disks or even completely clog the spaces between adjacent disks.

It has long been the practice to fixedly mount flat or curved scraper blades on the harrow framework by means of suitable clamps and to cause the scraping edges of such blades to be positioned sufficiently close to the inner or concave sides of the disks that the blades will dislodge soil from the blades. Conventional scraper blades of this character are possessed of several limitations, principal among which is the difficulty encountered in effecting initial blade adjustment so that each blade will attain a predetermined spacing from its associated disk or, alternatively a predetermined degree of light pressure against such disk. A further limitation that is attendant upon the construction and use of conventional scraper disk arrangements resides in the inability of the scraper blades to maintain their proper alignment with the disk, this despite the fact that certain scraper blades are possessed of an appreciable degree of flexibility. Yet another limitation that is present in connection with conventional scraper blade arrangements, particularly for disk harrows of the folding wing tandem type, resides in the fact that frame interference precludes the application of scraper blades to certain of the disks or, alternatively, renders it difficult to mount special clamping means which will accommodate such scraper blades. Additionally, where furrow filler disks are employed at the outer ends of the disk gangs associated with certain types of disk harrows, it has been considered necessary to provide scraper mounting bracket extensions for such furrow filler disks.

The present invention is designed to overcome the above noted limitations that are attendant upon the construction and use of conventional scraper means for the disks of agricultural disk harrows and, toward this end, the invention contemplates the provision of a novel scraper means which will accommodate all of the disks associated with one disk gang section and which embodies an axially shiftable support bar which extends alongside the frame bar of such disk gang section and from which support bar a series of scraper arms, one for most disk, depend. The scraper arms are formed of flexible steel stock and the lower ends thereof carry scraper blades which are designed for scraping cooperation with their associated disks. The upper ends of each scraper arm is provided with a laterally turned wide angle concavoconvex attachment portion of small extent which presents its concave side toward the support bar. A tension bolt extends through the apex region of the attachment portion and, when progressively tightened, serves to flex the attachment portion so as to decrease the wide angle characteristic thereof and thus shift the depending portion of the scraper arm in the direction of its associated disk for scraper blade adjusting purposes. The various scraper arms are thus individually adjustable by the simple expedient of adjusting the tension in the respective tension bolts. Collective adjustment of all of the scraper arms is made possible by shifting the scraper support bar axially. The advantage of providing both collective and individual adjustment for the various scraper arms will become readily apparent when the nature of the invention is better understood.

A loose connection is provided between each scraper paddle and its scraper arm which permits the paddle more relative to the scraper arm to thus align itself with respect to the associated disk and to compensate for disk wobble.

In connection with disk harrows which employ folding wing gang structures a modified form of scraper arm adjustment is provided for use in the vicinity of regions where the hinge connection between adjacent disk gangs would interfere with and preclude the use of the aforementioned form of scraper arm. In such modified form, a downwardly offset support presents a flat vertical surface while a concavo-convex attachment portion on the scraper arm presents its convex side toward the vertical surface so that a pair of tension bolts which extend through the attachment portion on opposite sides of the apex region thereof will, when progressively tightened, serve to increase the wide angle characteristic thereof and thus shift the lower portion of the scraper arm in the direction of the associated disk for scraper adjusting purposes.

In connection with disk harrows having disk gangs which employ outboard furrow filler disks, another modified form of scraper arm construction is employed. In such an instance, an overhanging extension bracket at the outer end of the scraper arm support bar is provided.

The provision of a scraper means such as has briefly been outlined above, and possessing the stated advantages, constitutes the principal object of the present invention.

Numerous other objects and advantages of the invention, not at this time enumerated, will become readily apparent as the following description ensues.

In the accompanying three sheets of drawings forming a part of this specification, several illustrative embodiments of the invention have been shown.

In the drawings:

FIG. 1 is a fragmentary perspective view of a limited portion of a tandem disk harrow of the folding wing type and showing two forms of the present adjustable disk scraper mechanism operatively installed thereon, the view representing one of the front wing gangs and an adjacent portion of its associated main gang;

FIG. 2 is a sectional view taken substantially on the vertical plane indicated by the line 2—2 of FIG. 1 and in the direction of the arrow;

FIG. 3 is a fragmentary perspective view of the outer end region of one of the rear wing gangs showing a furrow filler disk operatively applied thereto and illustrating a modified form of adjustable disk scraper mechanism associated therewith;

FIG. 4 is an enlarged fragmentary exploded perspective view showing a scraper supporting anglepiece and one of its associated scraper arms, and illustrating the manner in which such anglepiece is adjustably mounted on its associated support bar;

FIG. 5 is a fragmentary perspective view, illustrating the manner in which the scraper supporting anglepiece may be adjusted longitudinally to effect an initial collective adjustment of a gang of scraper arms;

FIG. 6 is an enlarged sectional view taken substantially on the line 6—6 of FIG. 1;

FIG. 7 is a fragmentary sectional view, partly in elevation, illustrating schematically the manner in which one form of an individual scraper arm and its associated scraper paddle or blade may be adjusted toward and away from the associated disk for pressure regulating purposes;

FIGS. 8 and 8a, considered collectively, are fragmentary sectional views, partly in elevation, illustrating schematically the manner in which a different form of scraper arm and its associated paddle are capable of being adjusted;

FIG. 9 is a fragmentary sectional view similar to FIG. 7 illustrating the manner in which an outboard scraper arm is nested with its associated support bracket; and FIG. 10 is an enlarged fragmentary detail sectional view taken substantially on the line 10—10 of FIG. 7 and indicating the manner in which each paddle is attached by a step rivet connection to its respective scraper arm.

Referring now to FIGS. 1 to 3, inclusive, several forms of adjustable disk scraper mechanism have been illustrated herein and, as in environment therefor, they are shown as being operatively associated with a tandem type disk harrow which generally is of the form shown and described in U.S. Pat. No. 3,831,685, granted on Aug. 27, 1974 and entitled DISK GANG COUPLING FOR HARROWS AND THE LIKE. Briefly, a disk harrow of this type is comprised of a frame which carries four pairs of disk gangs including right and left pairs of front gang assemblies and right and left rear pairs of gang assemblies, each pair of gang assemblies being comprised of an inner fixed main gang section and an outer movable wing gang section which is capable of being folded upwardly and inwardly over the fixed gang section in order to reduce the overall width of the implement when the latter is in transport. In FIGS. 1 and 2, portions of the front right pair of gang assemblies are disclosed while in FIG. 3 a limited portion of the outer left rear wing gang is disclosed. It will be understood that the foldable pair of front wing gang assemblies illustrated in FIGS. 1 and 2 serve to precede and are accompanied by a similar pair of rear wing gang assemblies, and that the outer left rear wing gang illustrated in FIG. 3 serves to trail and is accompanied by a similar left front wing gang. For a full understanding of the disposition of the various pairs of gang assemblies which cooperate to make up a complete tandem disk harrow of the type with which the present invention is concerned, reference may be had to the aforementioned patent No. 3,831,685, the entire disclosure of which, insofar as it is consistent with the present disclosure, is hereby incorporated in and made a part of the present specification by reference thereto.

Referring now in detail to FIGS. 1 and 2, the tandem type disk harrow to which the various scraper mechanisms of the present invention is applied embodies a fixed inner gang section which is fragmentarily shown at 10 and an outer wing gang section 12 hingedly connected thereto, the hinge connection 14 between the two gang sections being clearly shown in FIG. 2. Insofar as the disk mounting characteristics of the front main gang section is concerned, such section embodies a series of disks 16 which are supported beneath an overlying disk carrying frame member 18 from which there depend a series of bearing-supporting arms 20 which carry bearing assemblies 22 at their lower ends. The bearing assemblies serve to rotatably support a common arbor shaft 23 having square sections (not shown) which receive thereover the disks 16 in the usual manner of disk mounting, while spacer spools 24 serve to position the disks in their spaced relationship. An arbor nut 26 at the end of shaft 22 serves to clamp the various disk-supporting parts together.

The front wing gang section 12 is similar to the main front gang section 10, it being sufficient for descripive purposes to state that such section embodies a series of disks 30, a disk carrying frame member 32, depending bearing supporting arms 34 (FIG. 1), bearing assemblies (not shown), an arbor shaft 38, spacer spools 40 and arbor nuts 42, these elements being substantially identical to the corresponding elements heretofore described in connection with the main gang section 10. It will be appreciated that when the two frame members 18 and 32 are in alignment, they constitute, in effect, a composite support for the front pair of gang assemblies as a whole.

Still referring to FIGS. 1 and 2, as previously stated that front pair of gang sections 10 and 12 are accompanied by a trailing pair of rear gang sections (not shown in FIGS. 1 and 2) and, accordingly, longitudinal frame members 43, only one of which appears in FIGS. 1 and 2, extend between the main gang sections, while a similar pair of inner and outer longitudinal frame members 44 and 46 extend between the outer front and rear wing gang sections. The front and transverse frame members 32 and the longitudinal frame members 44 and 46 thus establish a generally trapezoidal framework which is hinged to a fixed rectangular framework, the latter including the fornt and rear frame members 18 and also the longitudinal frame members 43. This trapezoidal framework is capable of being swung bodily about the axis of the hinge connection 14 so that the front and rear wing gang sections 12 move in unison for wing folding purposes. A diagonal strut 48 extends between the inner and outer longitudinal frame members 44 and 46.

In order to shift the aforementioned trapezoidal framework and consequently the front wing gang section between its horizontal operative position and its folded overlying position, a lift arm 50 is pivoted at its proximate end to a suitable point on the aforementioned fixed rectangular frame which includes the frame members 18 and has its distal end pivotally connected as indicated at 52, to the upper end of a draw link 54. The lower end of the draw link is provided with a yoke 56 which carries a transverse lift pin 58 which passes through an upstanding lug 60 on the diagonal strut 48 so that upon upward swinging motion of the lift arm 50 the trapezoidal framework which includes the front frame member 32 is caused to swing upwardly about the axis of the hinge connection 14. An anglepiece 62 extends between the longitudinal frame member 44, and the yoke 56 and one flange thereof receives the transverse lift pin 58 therethrough, thus lending further strength to the lifting connection between the draw link 54 and the trapezoidal framework which carries the frame member 32.

Lifting power is applied to the trapezoidal framework which includes the front frame member 32 by means of a hydraulic cylinder and plunger mechanism 63 which has a pivotal connection 64 at one end to the front frame member 18, and a pivotal connection 66 at its other end to a point on the lift arm 50 which is close to the distal end of the latter.

The arrangement of parts thus far described is purely conventional and no claim is made herein to any novelty associated with the same, the novelty of the present invention residing rather in the adjustable disk scraper mechanisms which are variously applied to the front and rear inner fixed frame members 18 and to the front and rear outer frame members 32 and which will now be fully described and subsequently claimed.

Still referring to FIGS. 1 and 2, and additionally to FIGS. 4 and 6, according to the present invention novel scraper means are provided for effecting a scraping action on the concave sides of disks 16 associated with the front inner gang section 10. Insofar as the disks 16 are concerned, the scraper means for each disk except the end-most disk which is in the vicinity of the hinge connection 14 are identical. So also are the scraper means for all of the disks 30. A somewhat different scraper means is required for the disk 16 in the vicinity of the hinge connection 14 for a reason that will be made clear presently.

All of the scraper means for the disks 30 are supported on a scraper-carrying support in the form of an anglepiece 70 which is adjustably positioned a slight distance rearwardly of the frame member 32 and which is secured in various adjusted positions by means of overhanging support brackets 72 (see also FIGS. 4, 5 and 6), the anglepiece 70 being substantially coextensive with the frame member 32. The specific means for adjusting the position of the angle-piece 70 (which will hereinafter be referred to simply as the scraper angle) and the reason for effecting such adjustment, will be described in detail presently. Similarly, all of the scraper means for the disks 16 are supported upon a scraper angle 74 similar to the scraper angle 70 and which is similarly maintained in position rearwardly of the frame member 18 by means of overhanging support brackets 72.

Referring now to FIGS. 4, 6 and 7, the scraper angle 70 includes a horizontal flange 76 and a vertical flange 78, the horizontal flange being formed with a series of longitudinally spaced slots 80, there being one slot for each disk 30. Adjustably secured to the underneath side of the horizontal flange 76 in the vicinity of each slot 80 is a scraper unit 82 including a scraper arm 84 and a scraper blade or paddle 86. The scraper arm 84 is formed of spring steel and includes a depending section 87 the lower region 88 of which is inclined out of the plane of the section 86. The scraper arm 86 further includes a laterally turned upper section 90 which is possessed of wide angle concavo-convex configuration with its concave side facing upwardly and against the horizontal flange 76 so that the ends of the section slope away from the flange. This concavo-convex section 90 is formed with a slot 92 therein in the apex region thereof. A special bolt 94 (FIG. 7) having an enlarged head portion 95, a generally oblong shoulder 96, and a threaded shank 98 projects through the slots 92 and 80 and receives thereon a nut 100 and a washer 101 and the nut 100, when tightened, serves to secure the scraper unit 82 in position on the scraper angle 70.

It is to be noted at this point that because the scraper arm 84 is formed of spring steel, and because of the fact that the laterally turned upper section 90 of the arm 84 possesses concavo-convex aspects as described above, the degree of tightening of the nut 100 will tend to decrease the convexity of the section 90 and thus control the inclination of the arm 84, and consequently the lateral displacement of the scraper blade 86 toward and away from its associated scraper disk 30. The distal end or edge of the blade 86 is curved so that it is commensurate with the curvature of the concave side of the disk 30. It is also to be noted that because of the lost motion of the bolt shank 98 within the slot 80, and the lost motion of the shoulder 96 within the slot 92, the position of the scraper unit 82 relative to the scraper angle is adjustable in a manner and for purposes that will be made clear presently.

The manner in which the scraper angle 70 is adjustable endwise is best illustrated in FIGS. 4, 5 and 6. Accordingly, each of the overhanging support brackets 72 is formed with a flat bridge portion 102 which is secured to the upper face of the frame member 32 by clamping means assembly 104. Each bracket 72 is provided with an overhanging portion 106 having a hole 108 formed therein. The horizontal flange 76 of the scraper angle 70 is provided with a slot 110 therein in the vicinity of each bracket 72 and a rectangular reaction adjustment plate 112 overlies each slot 110 and is interposed between the overhanging portion 106 of the bracket 72 and the scraper angle 70 and serves a purpose that will be made clear subsequently. A hole 114 is formed in the adjustment plate 112 while a clamping step bolt 115 (FIG. 5) having an enlarged head 116, a rectangular shoulder 118 and a threaded shank 120, projects through the slot 110, and holes 114, 108 and receives thereon a nut 122 and washer 124. The shoulder 118 projects into the slot 110 as clearly shown in FIG. 6 so that the bolt is held against turning movement. However, longitudinal shifting of the bolt relative to the slot is possible for scraper angle adjusting purposes as will be described presently. The adjusting plate 112 and overhanging support bracket 72 could of course be cast as a single piece of material.

Referring now to FIGS. 7 and 10, the connection between each blade or paddle 86 and its associated scraper arm 84 is a loose one in order that the blade may be selfaligning with respect to its associated disk 16 or 30, as for example to compensate for disk wobble. Accordingly, the scraper blade is connected to the inclined lower end region 88 of the scraper arm 84 by means of a pair of special step rivets 130 each of which has a head portion 138 a stepped shank including a cylindrical shoulder portion 134, a reduced portion 136, and a malleable tail portion 132. Each rivet is applied through a relatively large hole 140 which loosely encompasses the shoulder portion 134 and through a relatively small hole 142 which closely encompasses the reduced portion 136, while the malleable tail portion 132 is riveted over so as to compass the scraper arm 84 against the shoulder portion 134. The scraper blade 86 is thus floatingly carried by the scraper arm 84 and its associated rivets 130 with an appreciable degree of lost motion, thereby reducing the tendency for the scraper blade to align itself against its associated disk when the latter is in operation.

The particular form of scraper unit 82 described above is used for each of the scraper disks 30 associated with the front wing gang section 13, and it is also used for each of the disks 16 associated with the front fixed gang section, except for the particular disk 16 which underlies the hinge connection 14 and which, in order to avoid interference with the hinge pivot, requires a special scraper unit such as is shown in FIG. 8 and which will be described subsequently. When used in connection with the front gang section 10, the scraper units 62 cooperate with the scraper angle 74 in the same manner as they cooperate with the scraper angle 70. It will be understood that scraper units 82 identical with the described unit will also be used in connection with the right rear and left front and rear fixed section, as well as with the right and left wing gang sections which have not been disclosed herein.

Considering now the adjustment of the above-described scraper means for the various disks 30, and referring particularly to FIGS. 5 and 6, adjustment of any given scraper arm 84 to move the scraper blade or paddle 86 toward and away from the associated disk 30, or to regulate the pressure of the blade against the disk, may be effected at any time by the simple expedient of regulating the tension in the shank 98 of the bolt 94 by turning the nut 100 in one direction or the other. Tightening of the bolt serves to flatten the concavo-convex lateral section 90 and thus swing the scraper arm 84 to the left as viewed in FIG. 7, thereby moving the scraper blade 86 toward the disk 30 or increasing the pressure of such blade against the disk. Due to the shoulder 96 which is disposed in the slot 92, there is a tendency for the entire scraper unit 82 to rotate under the frictional drag of the nut. However, the vertical flange 78 of the scraper angle 70 constitutes an abutment which prevents such turning motion. It is thus unnecessary when applying torque to the nut 100 to hold the bolt head 116 against turning movement and as a consequence a single wrench may be applied to the nut 100 for scraper blade adjustment purposes. Although individual adjustment of the various scraper units 82 may be effected at any time, as for example when making field adjustments, initial adjustment of the series of scraper units 82 may be made by first loosening the nuts 100 and shifting the scraper 84 so that the various scraper blades present a predetermined small clearance with respect to their respective disks 30. Thereafter the nuts 100 are tightened and the gang of scraper arms 84 are shifted bodily to the left as viewed in FIGS. 5 and 6 by causing the scraper angle 70 to be shifted to the left until all of the scraper blades 86 barely touch the disks 30. Such shifting of the scraper angle 70 is effected by means of a special tool 143 such as is illustrated in FIG. 5, the tool embodying a lever plate 144 and a manipulating handle 145. A series of three circular holes 146 are provided in the lever plate 144, such holes establishing three different fulcrum axes for selective use in operating the lever plate. The distal end of the lever plate is provided with a curved cam surface 148 which is designed for camming engagement with the adjacent edge of the rectangular adjustment plate 112 when one of the fulcrum holes 146 is slipped over the nut 100 which is next adjacent to the support bracket 72. By loosening the nut 122 and utilizing the tool 143, the camming action of the latter against the adjacent edge of the reaction plate 112 will cause the scraper angle 70 to be shifted to the left as viewed in FIG. 5, it being understood of course that all of the nuts 122 associated with all of the support brackets 72 will have been previously loosened.

After the desired adjustment of the scraper angle 70 has been effected to bring the various scraper blades 86 into touching contact with their respective disks 30 as previously described, the various nuts 122 will be retightened so that the scraper angle will maintain such adjustment. If, after such adjustment of the scraper angle 70 a given scraper blade 86 shows an excess clearance from its respective disk 30, or if undue pressure is exerted against the disk, individual adjustment of such scraper blade may be effected by manipulating the nut 100 associated therewith as previously described.

Referring now to FIGS. 1, 2, 8 and 8a, it is to be noted that due to the hinge connection 14 between the inner fixed gang section 10 and the outer wing section 12, the previously described form of scraper unit 82 may not be used for the endmost disk 16 of the gang section 10 since the hinge connection would interfere with placement of the laterally turned upper section 90 of the scraper arm on the scraper angle 74. Accordingly, a special scraper unit 150 such as is shown in detail in FIG. 8 is employed. The scraper unit 150 finds its support from the bolt 94 associated with the next adjacent scraper unit 82 and it embodies composite scraper arms including a zig-zag shaped offset support 152 having a horizontal upper section 154 which overhangs an end of the scraper angle 74 and has its end region interposed between the laterally turned section 90 of the next adjacent scraper arm 84 and the underneath side of the scraper angle 74 is shown in FIG. 8a. As shown in FIG. 8, the offset support 152 further includes a vertical section 156, a horizontal section 158 and a terminal lower vertical section 160 to which there is attached a special flexible scraper arm proper 162 which carries a scraper paddle or blade 164 which is similar to the scraper blades 86. The offset support 152 may possess some flexibility but for all intents it is considered to be a fixed member to which the scraper arm 162 is adjustably secured. The scraper arm 162 embodies a wide angle concavo-convex section 166 the curvature of which may be regulated by a pair of nut and bolt assemblies 168, a substantially vertical section 170, and an inclined lower end section 172 to which the scraper paddle or blade 164 is applied by means of step rivets 173 which are similar in design and function to the step rivets 130 associated with the scraper blades 86.

Adjustment of the scraper arm 162 in order to vary the pressure of the scraper blade 164 against its associated disk 16 is accomplished by alternately tightening or loosening of the nut and bolt assemblies 168. Since the convex side of the section 166 faces and bears against the planar vertical section 160 of the support 152 in tangential fashion, adjusting of the nut and bolt assemblies 168 will pivot the concavo-convex section 166 on vertical section 160, thus adjusting the scraper blade 164 relative to the disk 16.

It is to be noted at this point that longitudinal or axial shifting of the scraper angle 74 in the manner previously described in connection with the scraper angle 70, and utilizing the special tool 144 (FIG. 5) will collectively shift the positions of all of the scraper arms 84 associated with scraper angle 74, as well as of the special scraper arm 162.

In FIG. 3 a fragmentary end portion of the rear left wing gang section 212 associated with the disk harrow implement is disclosed. It will be understood, of course, that the implement also embodies a complementary right wing gang section, as well as inner right and left main or fixed gang sections which have not been disclosed herein. In certain disk harrows it is customary to employ furrow filling disks such as the disk 200, such disk constituting the outermost disk. According to the present invention, special scraper means are provided to accommodate the disks 200. In view of the similarity between the rear outer left wing gang section 212 of FIG. 3 and the front outer right wing gang section 12 of FIG. 1, except for the complementary nature of these two gang sections, and in order to avoid needless repetition of description, similar reference numerals but of a higher order have been applied to the corresponding parts as between the disclosures of these two views.

Referring now specifically to FIGS. 3 and 9, the scraper means for the filler disk 200 includes a support bracket 201, the inner region of which is secured to the upper face of the scraper arm 270 by means of bolt and slot connections which include a pair of slots 202 which are formed in the bracket 201. The outermost slot 202 cooperates with the adjacent clamping bolt 294. The outer region of the support bracket 201 overhangs the outer end of the scraper angle 270 and is formed with an offset concavo-convex section 203. A scraper arm 204 depends from the overhanging portion of the bracket 201 and is provided with a vertical section 205, a horizontal section which includes a concavo-convex section 207 which nests in the concavo-convex section 203 and lower inclined section 206. A clamping bolt and nut assembly 208, similar to the assembly 94 of FIGS. 4 and 6, extends through the medial region of the concavo-convex section 207 and the outer end region of the bracket 201 so that, upon tightening of the assembly 208, the concavo-convex sections are locked together in a nesting relationship. A scraper paddle or blade 209 which is similar to the blades 86 of FIGS. 1, 2 and 7 is carried by the inclined section 206 of the scraper arm 204 by means of the same step rivets 130 in connection with FIG. 10.

From the above description it is believed that the nature and advantages of the present disk scraper means will be readily understood, regardless of whether such means assumes the form illustrated in FIG. 3, FIGS. 7, 8 and 8a, or FIG. 9. In any case, small increments of adjusting the bolt 94, or 168 will effect relatively large displacements of the associated scraper paddle or blade 86 or 164 as the case may be. Also, the scraper arms 84, 152 and 204 are subject to individual adjustment, as well as collective adjustment at the time that the scraper angles associated therewith are shifted by means of the special tool 143 in the manner described in connection with FIG. 5.

The invention is not to be limited to the exact arrangement of parts shown in the accompanying drawings or described in this specification since various changes in the details of construction may be resorted to without departing from the spirit of the invention. For example, whereas in FIG. 7 the laterally turned end section 90 of the scraper arm 84 is shown as being of concavo-convex construction by reason of planar sloping sides, it is contemplated that this section may be of arcuate configuration with a relatively long radius of curvature. Therefore, only insofar as the invention has particularly been pointed out in the accompanying claims is the same to be limited.

What is claimed is:

1. The combination with an agricultural implement having a generally horizontal transversely extending disk-carrying frame member, and a plurality of transversely spaced earth-working disks operatively suspended from said frame member, of scraper means for said disks, said scraper means comprising a scraper support mounted on said frame member and substantially coextensive therewith, a scraper unit for each of said disks, each unit comprising a scraper arm formed of spring steel stock effectively depending from said scraper support and having a scraper edge on its lower end and designed for scraping cooperation with one side of its associated disk, the upper end of said scraper arm being formed with a laterally turned section of concavo-convex configuration and the concave side of which opposes the scraper support, and a fastening bolt projecting through the apex region of said laterally turned section and also through the scraper support, said end and said support having complementary structure preventing rotational movement therebetween, said bolt upon tightening thereof decreasing the concavity of said section and thus swinging the depending portion of the scraper arm toward said disk for pressure regulating purposes.

2. The combination set forth in claim 1, wherein said laterally turned concavo-convex end of the scraper arm is comprised of a pair of flat sections which are disposed at an angle of slightly less than 180° to each other and wherein said apex region has a slot and said bolt has a complementary configuration engaging said slot thereby preventing rotational movement therebetween.

3. The combination set forth in claim 1, wherein said transversely extending scraper support is in the form of an anglepiece having a horizontal flange and a vertical flange, the fastening bolt is provided with a threaded shank which passes through said horizontal flange, and a nut is threadedly received on said shank whereby any tendency for the scraper arm to rotate in conjunction with the fastening bolt upon tightening of the latter will be resisted by engagement of said vertical flange of the anglepiece with an edge of the scraper arm.

4. The combination set forth in claim 3, wherein the threaded shank of said fastening bolt projects through a transversely extending slot in said horizontal flange of the anglepiece whereby limited longitudinal adjustment of the scraper arm bodily as a unit may be resorted to.

5. The combination set forth in claim 1, wherein means are provided whereby said scraper support is adjustably mounted for limited axial shifting movement on said transversely extending frame member, and means are provided for regularly adjusting the axial position of said scraper support whereby collective adjustment of all of said scraper arms may be effected in unison.

6. The combination set forth in claim 5, wherein the means for adjustably mounting the transversely extending scraper support on the frame member includes on overhanging bracket on said frame member, a clamping bolt projecting vertically through a pair of openings in said scraper support and bracket and adapted when tightened to secure the scraper support in selected positions on the frame member, and a pair of reaction members effective between said scraper support and bracket and capable when said clamping bolt is loosened to be pried apart to shift the position of said scraper support relative to the bracket, and consequently to said frame member of the implement.

7. The combination set forth in claim 6, wherein one of said reaction members comprises the fastening bolt which passes through the apex region of an adjacent scraper arm.

8. The combination set forth in claim 7, wherein the other reaction member comprises a flat plate interposed between the overhanging bracket and the scraper support and through which said clamping bolt extends.

9. The combination set forth in claim 7, wherein the opening in said scraper support is in the form of a longitudinally extending slot, the opening in said overhanging bracket closely surrounds said clamping bolt, and the flat plate which is interposed between the overhanging bracket and the scraper support is formed with an opening therethrough which closely surrounds said clamping bolt.

10. The combination set forth in claim 9, wherein said clamping bolt is of the step bolt type and is provided with a non-circular shoulder which is slidable in said longitudinally extending slot in the scraper support, the clamping bolt is provided with a threaded shank portion which projects through the opening in said scraper support, and a nut is received on the upper threaded end of said shank.

11. The combination set forth in claim 1, wherein the scraper edge on the lower end of said scraper arm is provided on the lower end of a substantially flat scraper blade which is floatingly secured to such arm by step rivets.

12. The combination set forth in claim 1 wherein said implement has a foldable disk gang assembly comprising an inner main gang section having a fixed transverse frame member, an outer wing gang section having a movable transverse frame member, hinge means connecting the outer end of said fixed frame member to the inner end of the movable frame member to permit swinging movement of the latter between an operative extended position of alignment with the fixed frame member and an inoperative folded position overlying such fixed frame member, said movable transverse frame member including a portion extending longitudinally from said inner end a scraper support mounted on each frame member, a plurality of transversely spaced earth-working disks operatively suspended from each frame member, the outermost disk associated with the inner gang section underlying said hinge means, a scraper unit for said disk and comprising a scraper arm depending from its associated scraper support and having a scraper edge on its lower end and designed for scraping cooperation with such disk, a fastening bolt securing the extreme upper end region of said scraper arm to its respective scraper support, the scraper arm for said outermost disk of the inner gang section being of a composite nature and formed with a downwardly offset horizontal section which underlies said hinge means and said frame portion extending longitudinally when said outer and inner frame members are in alignment whereby interference of said latter scraper arm with said hinge means and said frame portion extending longitudinally is avoided.

13. In an agricultural implement, the combination set forth in claim 12, wherein a common fastening bolt serves to secure the extreme upper end region of the composite scraper arm for the outermost disk of the inner gang section and the extreme upper end of the next adjacent scraper arm of such inner gang section.

14. in an agricultural implement, the combination set forth in claim 12, the extreme upper end region of the composite scraper arm for the outermost disk of the inner gang section is turned laterally and is interposed between the concavo-convex section of the next adjacent scraper arm of such inner gang section.

15. In an agricultural implement, the combination set forth in claim 14, wherein the extreme laterally turned upper end region of the composite scraper arm for the outermost disk of the inner gang section is flat and makes face-to-face contact with its associated scraper support, such composite scraper arm for the outermost disk of the inner gang section is provided with a downward extending lower section, a scraper arm proper is carried by said downwardly extending lower section, and means are provided whereby it may be adjusted in a transverse direction toward and away from said outermost disk of the lower gang section.

16. In an agricultural implement, the combination set forth in claim 15, wherein the means for adjusting said scraper blade comprises a concavo-convex section on the scraper blade which bears against said downwardly extending lower section of the composite scraper arm, and at least one fastening bolt which projects through said concavo-convex section, said lower section being effective when the bolt is tightened to decrease the concavity of such concavo-convex section.

17. In an agricultural implement, the combination set forth in claim 16 wherein the convex side of said concavo-convex section bears against and is tangential to said downwardly extending lower section of the composite scraper arm, and a pair of fastening bolts project through said concavo-convex section and downwardly extending lower section of the composite scraper arm and are effective, upon tightening thereof to increase the radius of curvature of said concavo-convex section.

18. In an agricultural implement, the combination set forth in claim 16 wherein the lower end of said scraper arm is provided with a scraper blade which is floatingly secured thereto by step rivets.

19. The combination set forth in claim 1, further comprising; a furrow filling disk disposed outwardly of said scraper support, and a special scraper unit for said furrow filling disk, said special scraper unit comprising a support bracket secured to said scraper support and overhanging the outer end thereof, said overhanging portion having a concavo-convex section, a scraper arm formed of spring steel stock depending from the overhanging portion of said support bracket and having a scraper edge on its lower end and designed for scraping cooperation with said furrow filling disk, the upper edge of said latter scraper arm being formed with a laterally turned section that has a concavo-convex section which nest with said concavo-convex section of said overhanging portion of the bracket, and a fastening bolt projecting through said laterally turned section and said overhanging portion and serving, when tightened, to prevent relative movement between said support bracket and said scraper arm.

* * * * *